(12) United States Patent
Katsaros et al.

(10) Patent No.: US 8,983,190 B2
(45) Date of Patent: Mar. 17, 2015

(54) DYNAMIC SERVICE CONFIGURATION DURING OCR CAPTURE

(71) Applicant: Bank of America Corporation, Charlotte, NC (US)

(72) Inventors: Georgios Katsaros, Apex, NC (US); Donald Werner Schoppe, Apex, NC (US); Bryan Anthony VonCannon, Charlotte, NC (US); Pavan Chayanam, Danville, CA (US)

(73) Assignee: Bank of America Corporation, Charlotte, NC (US)

( * ) Notice: Subject to any disclaimer, the term of this patent is extended or adjusted under 35 U.S.C. 154(b) by 74 days.

(21) Appl. No.: 13/965,351

(22) Filed: Aug. 13, 2013

(65) Prior Publication Data

US 2015/0049947 A1    Feb. 19, 2015

(51) Int. Cl.
 *G06K 9/18* (2006.01)
 *G06K 9/46* (2006.01)
(52) U.S. Cl.
 CPC ............... *G06K 9/18* (2013.01); *G06K 9/4604* (2013.01)
 USPC ........... 382/182; 382/162; 382/165; 382/167; 382/305; 705/26.7; 235/37.5
(58) Field of Classification Search
 CPC .... G06K 2209/01; G06K 9/342; G06K 9/346
 USPC ......... 382/182, 162, 165, 167, 305; 705/26.7; 235/37.5
 See application file for complete search history.

(56) References Cited

U.S. PATENT DOCUMENTS

| | | |
|---|---|---|
| 6,567,547 B1 | 5/2003 | Roman |
| 7,546,955 B2 | 6/2009 | Marty et al. |
| 2005/0067482 A1* | 3/2005 | Wu et al. ..................... 235/375 |
| 2006/0278714 A1 | 12/2006 | Ho et al. |
| 2013/0173402 A1* | 7/2013 | Young et al. ............... 705/14.73 |

* cited by examiner

*Primary Examiner* — Mike Rahmjoo
(74) *Attorney, Agent, or Firm* — Michael A. Springs (57) ABSTRACT

Dynamically configuring OCR processing may include determining a device type and determining whether to perform optical character recognition (OCR) processing of the received image locally based on one or more OCR parameters. Example OCR parameters may include the device type, the image type, the size of the received image, the available amount of the memory, the measured/benchmarked throughput of OCR processing on the device relative to an OCR server throughput and network throughput, and/or the current level of network connectivity. If it is determined that OCR processing of the received image should be performed locally, the device may compute one or more name-value pairs corresponding to the received image and transmit the name-value pairs to a remote data server for processing.

18 Claims, 4 Drawing Sheets

DYNAMIC SERVICE CONFIGURATION DURING OCR CAPTURE

TECHNICAL FIELD

The present disclosure relates to optical character recognition, and more particularly to the dynamic configuration of optical character recognition.

BACKGROUND

Many enterprises employ optical character recognition (OCR) to extract text from images for data processing. The optical images may be captured through a photograph or by scanning. The task of OCR processing may be performed by an OCR server. Certain enterprises may permit OCR capture from mobile devices, such as smartphones, tablets, or other portable computing devices. Some mobile devices may also have the computing resources to perform some or all of the OCR processing.

SUMMARY

In accordance with the present disclosure, a system for dynamic configuration of OCR processing is provided which substantially eliminates or reduces disadvantages and problems associated with previous systems and methods.

According to a particular embodiment, dynamically configuring OCR processing may include determining a device type and determining whether to perform optical character recognition (OCR) processing of an optical image locally based on one or more OCR parameters. Some example OCR parameters may include the device type, the image type, the size of the received image, the available amount of the memory, and/or the current level of network connectivity. If it is determined that OCR processing of the optical image should be performed locally, the device may compute one or more name-value pairs corresponding to the received image and transmit the name-value pairs to a remote data server for processing. In particular embodiments, the optical image may be received, captured, or selected by the user.

Particular embodiments provide various technical advantages. The present disclosure provides a flexible framework that permits the dynamic determination of whether to perform advanced OCR processing on the capture device or an OCR server based on a set of criteria. For example, a capture device may dynamically determine whether to perform advanced OCR processing locally based on device type, image type, image size, available memory, and/or network connectivity. Although legacy mobile devices may not be capable of performing advanced OCR processing locally on the device, many modern smartphones, tablets, and other mobile devices may have the computational resources to perform advanced OCR processing locally.

Embodiments according to the present disclosure may allow legacy devices to transfer captured images over the network to a server running OCR services. On the other hand, if the device is a modern mobile device, it may have the necessary computing resources to perform OCR on device, without any need for network connectivity or backend OCR services. In certain embodiments, the decision of whether to perform OCR processing locally may further depend on real-time conditions such as image type, available memory, and/or network connectivity.

Thus, an OCR framework is disclosed that that may be configured, built and deployed on both mobile devices and back-end server environments that enables the device to dynamically choose between on-device OCR processing or off-device processing based on available computational resources, network connectivity, and/or other related metrics.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Embodiments of the present disclosure and its advantages are best understood by referring to FIGS. 1-4, like numerals being used for like and corresponding parts of the various drawings.

Figure 1:
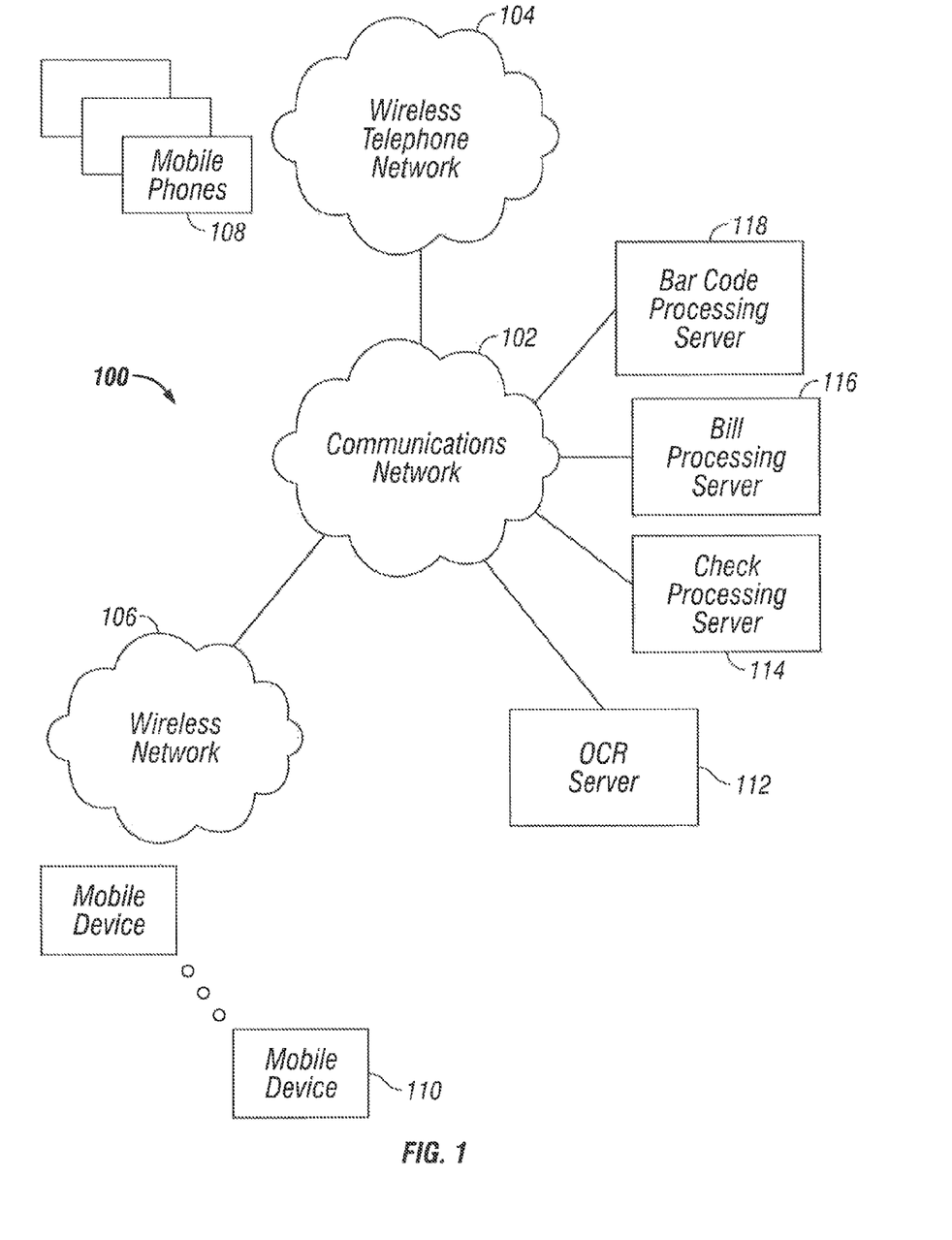
FIG. 1 is a block diagram illustrating a system environment with elements that interoperate to facilitate dynamic configuration of OCR processing.

FIG. 1 is a block diagram illustrating a system 100 with elements that interoperate to facilitate dynamic configuration of OCR processing. The elements of system 100 can support a number of different operations, including OCR capturing of an image, extracting text from the image, computing name-value pairs corresponding to the extracted text, confirming name-value pairs, and processing name-value pairs based on actions desired by the user. For example, in certain embodiments, a mobile device may capture an image for OCR processing, extract text from the image, compute corresponding name-value pairs, confirm the name-value pairs and communicate the name-value pairs to a remote data server for appropriate processing. In other embodiments, these tasks may be performed by an OCR server. In particular implementations, elements of system 100 may dynamically determine whether to perform OCR processing on the capture device or communicate the captured image to an OCR server for such processing. Certain embodiments of system 100 may be deployed by a banking institution to facilitate the processing of document images. For example, elements of system 100 may allow a banking customer to capture a picture of a check for OCR processing so that it may be deposited in the customer's account at a banking institution. Other embodiments may facilitate bar code processing, bill processing, and/or the processing of any suitable type of document.

In the illustrated embodiment, system 100 includes a number of elements interconnected by various networks, including a communications network 102, a wireless telephony network 104, and a wireless network 106. Networks 102, 104, and 106 represent communications equipment, including hardware and any appropriate controlling logic, for interconnecting elements and facilitating communication between these elements. Communications network 102 may include local area networks (LANs), metropolitan area networks (MANs), wide area networks (WANs), any other public or private network, local, regional, or global communication network, enterprise intranet, other suitable wireline or wireless communication link, or any combination thereof. Communications network 102 may include any combination of gateways, routers, hubs, switches, access points, base stations, and any other hardware, software, or a combination of the preceding that may implement any suitable protocol. For illustrative purposes, system 100 is also shown as including other specific types of networks, including wireless telephony network 104 and wireless network 108. The use of these or similar networks facilitate seamless communication between components of system 100 regardless of their geographic location or communication protocols.

As illustrated, system 100 includes a wireless telephony network 104 coupled to communications network 102. Wireless telephony network 104 represents communications equipment, including hardware and any appropriate controlling logic, for interconnecting elements and facilitating communications by wireless devices. Wireless telephony network 104 may include gateways, call managers, routers, hubs, switches, access points, base stations, cellular towers, radio networks, satellite telephone equipment implementing appropriate protocols for wireless telephony communications. While only one wireless telephony network 104 has been illustrated, it should be understood that various embodiments may operate using more than one wireless telephony network. In addition, various embodiments may incorporate wireless telephony networks 104 in other networks of system 100 such as, for example, wireless network 106.

The illustrated embodiment of system 100 also includes wireless network 106 coupled to communications network 102. Wireless network 106 represents communications equipment, including hardware and any appropriate controlling logic, for wirelessly interconnecting elements and facilitating communication between other elements of system 100. For example, wireless network 106 may operate according to one or more of the 802.11 standards promulgated by the Institute of Electrical and Electronic Engineers (IEEE). Wireless network 106 may include any combination of gateways, routers, hubs, switches, access points, base stations, wireless telephone systems and any other hardware, software, or combination thereof. While only one wireless network 106 has been illustrated, it should be understood that various embodiments may operate using multiple wireless networks 106. In addition, various embodiments may incorporate wireless networks 106 in other networks of communications network 102.

These networks interconnect other elements of system 100, including mobile phones 108, mobile devices 110. OCR server 112, check processing server 114, bill processing server 116, and bar code processing server 118. It should be understood that while system 100 is illustrated as including specific types of networks, various embodiments may operate using any suitable arrangement and collection of networks that enable appropriate communications.

Mobile phones 108 represent portable hardware and appropriate controlling logic for providing telephony and/or advanced data services. For example, mobile phones 108 may support voice and data communications. Mobile phones 108 may include smartphones capable of transmitting and receiving multiple forms of media including but not limited to audio, text messages, video, images, and content from disparate services. As illustrated, mobile phones 108 may be coupled to wireless telephony network 104 and capable of communicating to other components of system 100. According to particular embodiments, system 100 may use mobile phones to perform OCR capture and/or advanced OCR processing.

Mobile devices 110 represent any suitable portable hardware, including appropriate controlling logic and data, capable of communicating with remote devices to facilitate dynamic configuration of OCR processing. For example, mobile devices 110 may include, but are not necessarily limited to, mobile telephones, advanced phones (e.g., smartphones), personal digital assistants (PDAs), wireless handsets, notebook computer systems, and tablet computer systems. According to particular embodiments, mobile devices 110 include wireless devices with advanced user interfaces, such as the APPLE iPhone, iPod Touch, iPad, or an ANDROID device.

OCR server 112 represents any appropriate combination of hardware, controlling logic, and data for facilitating remote document processing from multiple mobile devices or phones. For example, OCR server 112 may include a networked server or collection of networked servers, or could include one or more virtual servers capable of acquiring computing resources on-demand depending on the dynamically determined needs of the system. Using virtual servers, OCR server 112 could be scaled dynamically based on system requirements and real-time usage, without limiting operation to a particular physical computer server having fixed computing resources. This could facilitate the scalability, efficient operation, high availability, and cost effectiveness of the system. As illustrated, OCR server 112 couples to networks, such as communications network 102, to facilitate communication to other elements of system 100.

Check processing server 114 represents any appropriate combination of hardware, controlling logic, and data for facilitating remote document processing of checks from multiple mobile devices or phones. For example, check processing server 114 may include a networked server or collection of networked servers, or could include one or more virtual servers capable of acquiring computing resources on-demand depending on the dynamically determined needs of the system. Using virtual servers, check processing server 114 could be scaled dynamically based on system requirements and real-time usage, without limiting operation to a particular physical computer server having fixed computing resources. This could facilitate the scalability, efficient operation, high availability, and cost effectiveness of the system. As illustrated, check processing server 114 couples to networks, such as communications network 102, to facilitate communication to other elements of system 100. In particular embodiments, check processing server 114 is capable of receiving name-value pairs corresponding to one or more checks to be processed by a banking institution. For example, check processing server 114 may receive check processing requests from mobile phones 108, mobile devices 110, and/or OCR server 112.

Bill processing server 116 represents any appropriate combination of hardware, controlling logic, and data for facilitating remote document processing of bills from multiple mobile devices or phones. For example, bill processing server 116 may include a networked server or collection of networked servers, or could include one or more virtual servers capable of acquiring computing resources on-demand depending on the dynamically determined needs of the system. Using virtual servers, bill processing server 116 could be scaled dynamically based on system requirements and real-time usage, without limiting operation to a particular physical computer server having fixed computing resources. This could facilitate the scalability, efficient operation, high availability, and cost effectiveness of the system. As illustrated, bill processing server 116 couples to networks, such as communications network 102, to facilitate communication to other elements of system 100. In particular embodiments, bill processing server 116 is capable of receiving name-value pairs corresponding to one or more bills to be processed by a banking institution or the originator of the bill. For example, bill processing server 116 may receive bill processing requests from mobile phones 108, mobile devices 110, and/or OCR server 112.

Bar code processing server 118 represents any appropriate combination of hardware, controlling logic, and data for facilitating remote document processing of bar codes from multiple mobile devices or phones. For example, bar code processing server 118 may include a networked server or collection of networked servers, or could include one or more virtual servers capable of acquiring computing resources on-demand depending on the dynamically determined needs of the system. Using virtual servers, bar code processing server 118 could be scaled dynamically based on system requirements and real-time usage, without limiting operation to a particular physical computer server having fixed computing resources. This could facilitate the scalability, efficient operation, high availability, and cost effectiveness of the system. As illustrated, bar code processing server 118 couples to networks, such as communications network 102, to facilitate communication to other elements of system 100. In particular embodiments, bar code processing server 118 is capable of receiving a bar code to be processed by the originator of the bar code, such as a banking institution. For example, bar code processing server 118 may receive bar code processing requests from mobile phones 108, mobile devices 110, and/or OCR server 112.

Particular embodiments are designed to operate in a network environment that facilitates the optical capture of documents and OCR processing of captured images. In particular embodiments, OCR processing may include extraction of text, computation of name-value pairs, and communication of verified name-value pairs to an appropriate data server for processing. In particular embodiments, a name-value pair may represent a data field and a corresponding value. For example, a check may have an amount field that contains a specific corresponding value. In appropriate embodiments, the amount field and corresponding value may be processed as a name-value pair. Systems, methods, and software described by example in the present disclosure may increase the efficiency and speed of OCR processing by determining dynamically whether to perform certain aspects of OCR processing locally on a user device or remotely by an OCR server.

In operation, elements of system 100 operate together to perform various OCR processing functions including but not limited to maintaining a central, unified repository of document images and name-value pairs, facilitating maintenance and display of captured OCR images and extracted name-value pairs, and enabling data processing of verified name-value pairs. For example, in particular embodiments, elements of system 100 may allow a banking customer to photograph a bar code, bill, or check for OCR processing.

In particular embodiments, mobile phones 108 or mobile devices 110 are capable of performing initial optical capture of documents for OCR processing. The optical capture may be performed by a camera or scanner of the mobile phones 108 or mobile devices 110, as appropriate. Following image capture, the mobile phone 108 or mobile device 110 may dynamically determine, based on a variety of parameters, whether to perform advanced OCR processing locally or transmit the captured image to OCR server 112. In particular embodiments, the decision of whether to perform OCR processing locally may depend on the computing resources of mobile phone 108 or mobile device 110. For example, mobile phone 108 or mobile device 110 may decide to perform OCR processing locally based on the device type, image type, size of the image, available memory of the mobile phone 108 or mobile device 110, and/or level of network connectivity. In certain implementations, if it is determined that OCR processing should be performed locally, mobile phone 108 or mobile device 110 may perform advanced OCR operations such as extracting text from the received image, determining the name-value pairs based on the extracted text, requesting confirmation of the name-value pairs by the user, and transmitting confirmed name-value pairs and other data to a remote data server for data processing, such as check processing server 114, bill processing server 116, or bar code processing server 118.

In some implementations, mobile phone 108 or mobile device 110 may determine that OCR processing should be performed remotely. In those circumstances, mobile phone 108 or mobile device 110 may employ appropriate networks to communicate the image to OCR server 112. For example, mobile phone 108 may transmit the image to the OCR server 112 across wireless telephony network 104 and communications network 102. As another example, mobile device 110 may transmit the image to OCR server 112 across wireless network 106 and communication network 102. OCR server 112 may perform advanced OCR operations such as extracting text from the received image, determining the name-value pairs based on the extracted text, requesting confirmation of the name-value pairs by the user, and transmitting confirmed name-value pairs and other data to a remote data server for data processing, such as check processing server 114, bill processing server 116, or bar code processing server 118.

A component of system 100 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more non-transitory tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic. Any suitable logic may perform the functions of system 100 and the components within system 100.

While system 100 is illustrated as including specific components arranged in a particular configuration, it should be understood that various embodiments may operate using any suitable arrangement and collection of components capable of providing functionality such as that described.

Figure 2:
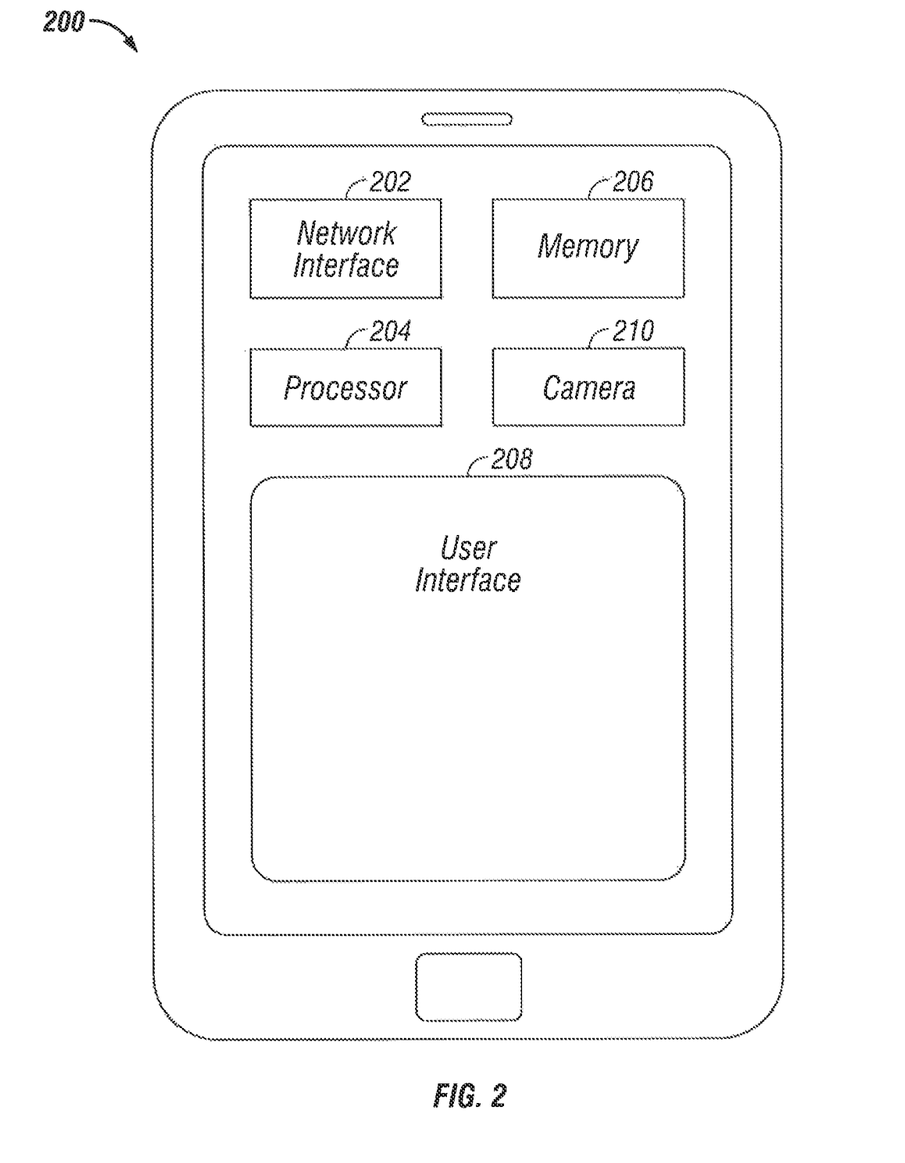
FIG. 2 is a block diagram illustrating an example embodiment of a mobile device for executing OCR applications and facilitating the dynamic configuration of OCR processing.

FIG. 2 is a block diagram illustrating a mobile device 200 representing an example embodiment of mobile phone 108 or mobile device 110. As illustrated, mobile device 200 includes a number of components that operate together to facilitate the dynamic configuration of OCR processing. Mobile device 200 can support a number of different operations, including receiving optical images of documents, presenting the image on a user interface, and dynamically determining whether to perform OCR processing locally. In addition, mobile device 200 may facilitate extraction of text from the image, computation of name-value pairs, and communication of the name-value pairs and other information to a remote data server for data processing. In some embodiments, mobile device 200 may permit transmission of the image to OCR server 112 for remote OCR processing.

As illustrated, mobile device 200 includes a number of components for receiving, maintaining, processing, and displaying OCR information. Mobile device 200 may represent any suitable portable hardware, including appropriate controlling logic and data capable of communicating with remote devices and systems, receiving user input, and displaying OCR information. As shown, mobile device 200 includes several components, which may include a network interface 202, a processor 204, a memory 206, a user interface 208, and camera 210.

Network interface 202 represents any appropriate combination of hardware and controlling logic for coupling to one or more networks. Network interface 202 may support any number of suitable protocols for communicating on a communication network. For example, network interface 202 may be a wireless local area network interface, cellular network interface, satellite interface, and/or any other appropriate interface for communicating on a communication network. Network interface 202 may have multiple interfaces for handling different communication protocols.

Processor 204 represents one or more processing elements, including hardware, logic, and data capable of controlling the operation of mobile device 200. For example, processor 204 may be a computer processor for executing an application stored in memory 206, or any other software or controlling logic associated with mobile device 200, such as a mobile operating system. According to particular embodiments, processor 204 may be a programmable logic device, a microcontroller, a microprocessor, any other appropriate processing device, or any suitable combination of the preceding.

Memory 206 represents appropriate hardware and control logic for maintaining optical images, OCR processing logic, and name-value pairs. Memory 206 may also include storage for other data, such as a mobile operating system of mobile device 200. As illustrated, memory 206 may include a non-volatile portion and a volatile portion. The non-volatile portion of memory 206 may represent memory for maintaining persistent applications and/or data. Volatile portion of memory 206 represents storage for maintaining non-persistent applications and/or data. According to particular embodiments and design considerations, some or all of the optical images, name-value pairs, and other OCR data may be stored in the non-volatile portion or volatile portion of memory 206.

Mobile device 200 also includes a user interface 208. User interface 208 represents any appropriate combination of hardware, control logic, and data for displaying information to a user and receiving inputs from a user. Thus, user interface 208 includes any input and/or output interface. For example, a user interface may be a touch screen interface that is capable of both displaying optical images and receiving user inputs. User interface 208 of mobile device 200 may be used to display OCR information using optical images, name-value pairs, and any suitable application interface for OCR processing. For example, a banking institution may use user interface 208 to present a mobile banking application interface to facilitate optical capture of documents and subsequent OCR processing.

Camera 210 represents any appropriate combination of hardware, control logic, and data for capturing optical images of any object including documents. Camera 210 may include any appropriate optical components and processing capabilities to focus, capture, and process a snapshot of a document.

In particular embodiments, camera 210 may be part of mobile device 200. In other embodiments, camera 210 may be functionally coupled to mobile device 200. Among other tasks, camera 210 may be used by a user of mobile 200 to capture images of documents for OCR processing. In certain embodiments, camera 210 may be operated through an appropriate mobile application, such as a mobile banking application.

In particular embodiments, mobile device 200 is capable of capturing and receiving optical image information, determining whether to process the image locally, and, as appropriate, performing advanced OCR operations. In some implementations, the image may be transmitted to an OCR server for processing. For example, mobile device 200 may be used by banking users to scan documents for processing by a banking institution. Such documents may include checks, bills, and/or bar codes. Mobile device 200 may extract text, compute name-value pairs, and transmit the name-value pairs and other related information to a remote data server for processing. In particular embodiments, mobile device 200 may seek confirmation of the results of OCR processing by the user for accuracy before the results are transmitted to the remote data server for processing. Thus, a device such as mobile device 200, enables optical images to be optimally captured, processed, and forwarded to the appropriate data servers for efficient processing.

In operation, mobile device 200 may execute an appropriate application, such as a mobile banking application, to present a user with various choices for processing an image using user interface 208. For example, a user may choose whether to perform OCR processing on various types of documents, such as a check, bill, or a bar code. Upon selection, mobile device 200 may cause user interface 208 to present an interface to capture an optical image using camera 210. In particular embodiments, camera 210 may be actuated by the user by using user interface 208 to capture an optical image of a document. Processor 204 may receive the optical image and cause it to be stored in memory 206. Next, processor 204 may execute appropriate OCR logic to determine whether to perform OCR processing locally. In particular implementations, processor 204 may access memory 206 to determine the device type, image type, size of image, available memory. In addition, processor 204 may communicate with network interface 202 to determine a level of network connectivity.

By executing appropriate control logic, mobile device 200 may determine whether to conduct the OCR processing locally based on a number of parameters. These parameters may include the device type, image type, size of the image, available memory, and level of network connectivity. In some embodiments, mobile device 200 may further be operable to employ processor 204 to perform advanced OCR processing such as extracting text from the image, determining name-value pairs based on the extracted text, and requesting confirmation of the name-value pairs using the user interface 208. Once name-value pairs are confirmed, mobile device 200 may employ network interface 202 to communicate name-value pairs and other appropriate information to a remote data processing server for additional processing. Such remote data processing servers may include a check processing server, bill processing server, or bar code processing server. For each stage of the local advanced OCR processing, mobile device 200 may keep the user apprised of the progress using user interface 208.

In other embodiments, mobile device 200 may communicate the captured image, using network interface 202, to an OCR server for advanced OCR processing. Such advanced OCR processing may include text extraction and computation of name-value pairs. In appropriate embodiments, mobile device 200 may receive the name-value pair results from OCR server for confirmation. In those embodiments, mobile device 200 may employ network interface 202 to communicate the confirmed name-value pairs and other appropriate information to a remote data processing server, such as a check processing server, bill processing server, or bar code processing server. For each stage of the advanced OCR processing by the OCR server, mobile device 200 may receive progress updates from the OCR server and keep the user apprised of the progress using user interface 208.

While mobile device 200 is illustrated as including specific components, it should be understood that various embodiments may operate using any suitable arrangement and collection of components.

Figure 3:
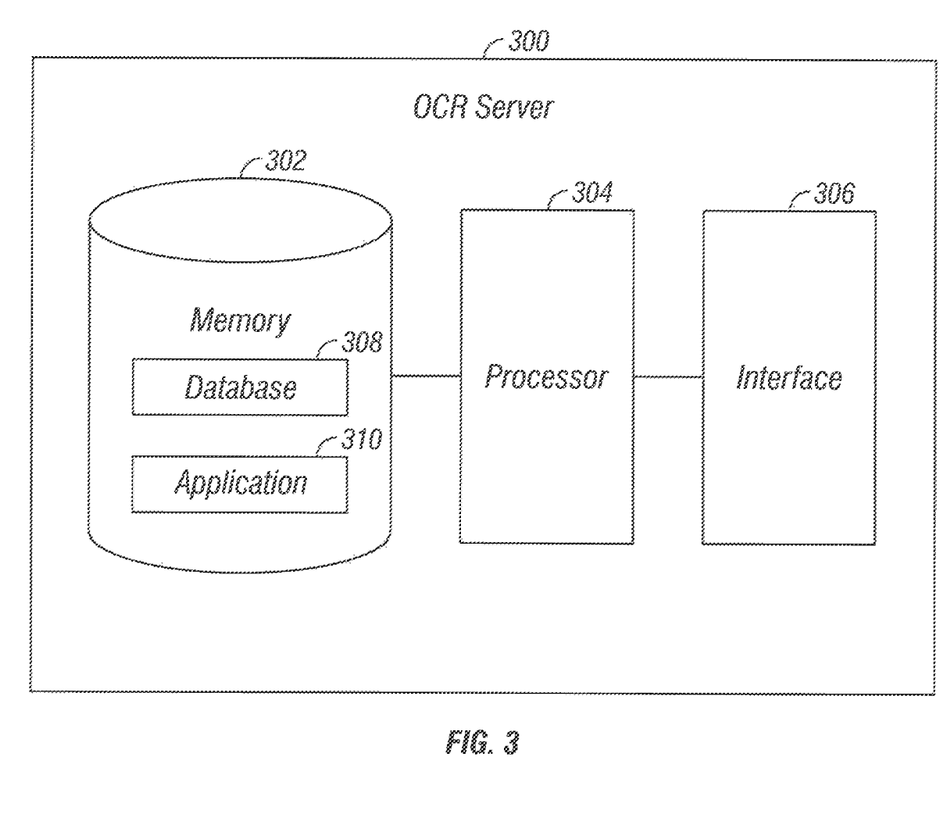
FIG. 3 is a block diagram illustrating an example OCR server for performing various aspects of OCR processing.

FIG. 3 illustrates a system 300 as a particular embodiment of an OCR server 112 that receives optical image data and processes it according to particular control logic. In a particular embodiment, system 300 represents a proprietary Bank of America OCR server that facilitates the OCR processing of documents corresponding to particular banking customers.

As illustrated, system 300 may include various interconnected elements including a memory 302, a processor 304, and an interface 306. Memory 302 stores, either permanently or temporarily, data, operational software, or other information for processor 304.

Memory 302 represents any suitable combination of volatile or non-volatile, local or remote devices suitable for storing information. For example, memory 302 may include RAM, ROM, magnetic storage devices, optical storage devices, or any other suitable information storage device or a combination of such devices. As illustrated, memory 302 includes a database 308, and application 310 to facilitate advanced OCR processing. Database 308 represents a relational database for storing and organizing various types of OCR data, such as document types, data fields, and name-value pairs. In particular embodiments, database 308 may be a SQL database capable of organizing OCR data.

Application 310 generally refers to logic, rules, algorithms, code, tables and/or other suitable instructions for performing the described functions and operations of system 300. In certain embodiments, application 310 may facilitate the interaction of system 300 with data servers 114, 116, and/or 118, mobile phones 108, and mobile devices 110 using network 102, 104, and/or 106.

Processor 304 represents one or more processing elements, including hardware, logic, and data capable of controlling the operation of system 300. For example, processor 304 may be a computer processor for executing an OCR application stored in memory 206, or any other software or controlling logic associated with system 300, such as an appropriate operating system. According to particular embodiments, processor 304 may be a programmable logic device, a microcontroller, a microprocessor, any other appropriate processing device, or any suitable combination of the preceding.

Interface 306 represents any appropriate combination of hardware and controlling logic for coupling to one or more networks. Interface 306 may support any number of suitable protocols for communicating on a communication network. For example, network interface 306 may be a wireless local area network interface, cellular network interface, satellite interface, and/or any other appropriate interface for communicating on a communication network. Interface 306 may have multiple interfaces for handling different communication protocols.

In operation, processor 304 interacts with interface 306 to receive optical images and related OCR data from a plurality of devices, such as mobile phones or mobile devices. System 300 may receive optical images and related OCR data in response to a determination by each of the devices that advanced OCR processing should be performed on system 300, as opposed to locally on the device. Processor 304 may execute appropriate control logic as defined by application 310 to extract text from the received optical images and compute appropriate name-value pairs. In order to determine or anticipate name-value pairs, processor 304 may perform appropriate lookups in database 308. In some embodiments, the name-value pairs may have a fixed range of values based on the type of image or source document. After the name-value pairs are computed, processor 304 may transmit the name-value pairs to the appropriate device for confirmation.

While system 300 is illustrated as including specific components, it should be understood that various embodiments may operate using any suitable arrangement and collection of components.

Figure 4:
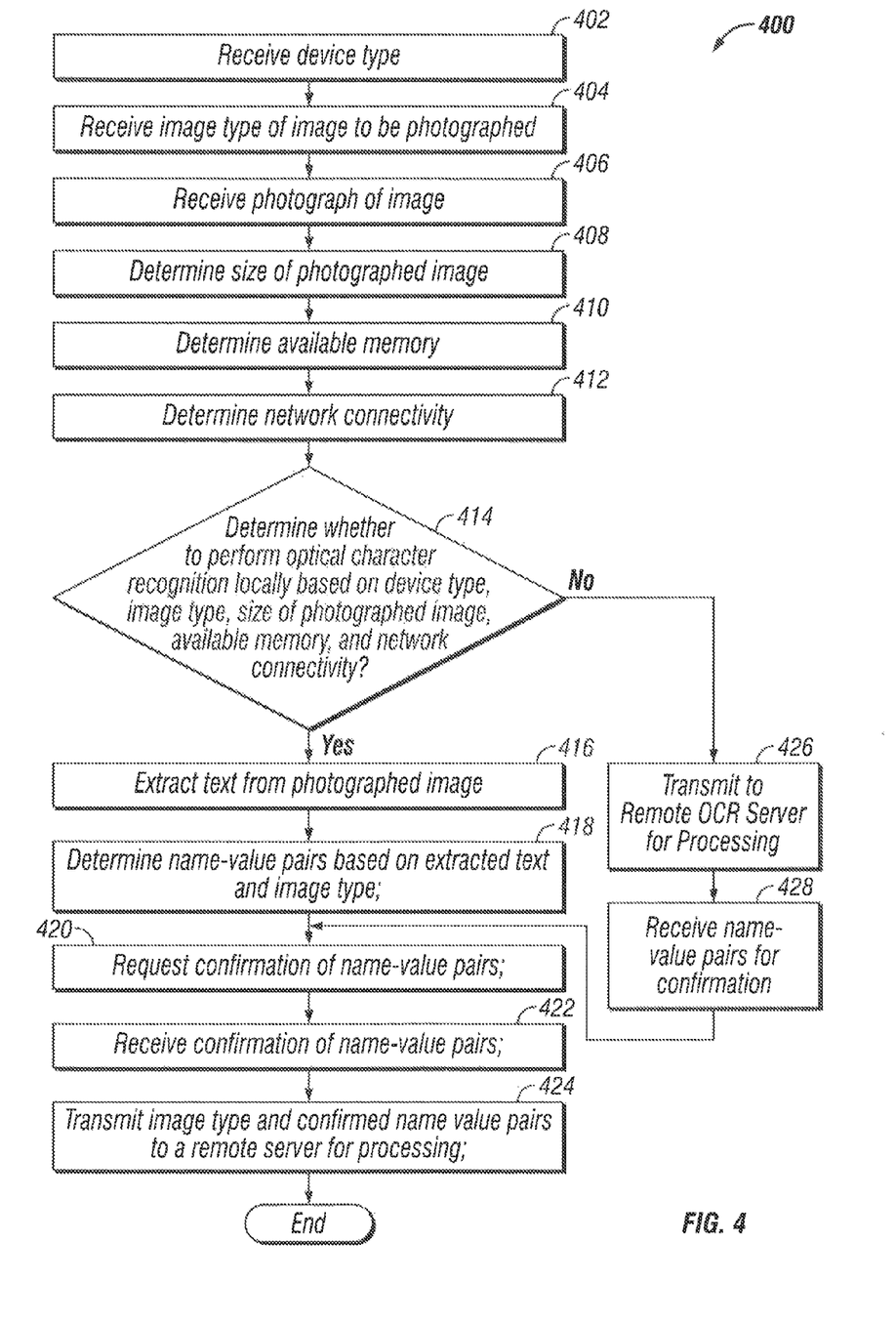
FIG. 4 illustrates an example process flow for dynamic configuration of OCR processing.

FIG. 4 is a process flow diagram illustrating process flow 400 for dynamic configuration of OCR processing. The steps of process flow 400 correspond to an example sequence of steps for performing advanced OCR processing. A process like process flow 400 may be implemented on an appropriate device, such as a mobile phone or other suitable mobile device.

In the illustration, process flow 400 includes a number of steps for assessing whether to perform advanced OCR processing locally and, if such a decision is made, various steps for performing advanced OCR processing locally. As shown, these steps include a device type detection step 402, an image type detection step 404, an optical image capture step 406, an image size detection step 408, an available memory detection step 410, a network connectivity detection step 412, a local OCR processing determination step 414, an extraction step 416, a name-value pair computation step 418, a name-value confirmation request step 420, a name-value confirmation step 422, name-value transmission step 424, an optical image transmission step 426, and a name-value pair reception step 428. This collection of steps may be performed, for example, on a device, such as mobile device 200.

In operation, process flow 400 begins at the device type detection step 402. At this step, the device may determine the particular type of device. In particular implementations, a device implementing the steps of process flow 400 may determine whether the type of the device is one of the predefined supported devices. A supported device may be a device that is known to have the basic computing resources necessary to perform advanced OCR processing locally. In other implementations, the decision of whether a device is supported may be influenced by statistics collected by performing advanced OCR processing on a sample optical image after installation or the first time advanced OCR processing is requested. In particular embodiments, the statistics gathered by processing the sample optical image may be compared to benchmark or actual statistics gathered by processing the sample image at an OCR server. In some implementations, the determination that a device is a supported device may depend on whether a particular application is installed and appropriate OCR libraries are installed and functional. Although a device is a supported device, advanced OCR processing may be performed on an OCR server due to other considerations such as the type of the document, the available memory, the size of the optical image, and/or the level of network connectivity.

Next, process flow 400 continues to the image type detection step 404. In this step, the device determines the type of the image to be photographed or scanned. In a particular implementation, the image type may be provided by the user.

For example, for a mobile banking application, the image type may be a check, bill, or bar code. A user may provide the image type using an appropriate user interface. In particular embodiments, the decision of whether to perform advanced OCR processing locally may be impacted by the image type. Certain image types may require more computing resources than others, which may cause a device to transfer the captured image to an OCR server for processing. For example, OCR processing of a bill may be more resource intensive than OCR processing of a bar code.

Next, in step 406, the optical image of the document is captured using an appropriate camera or scanner. In step 408, the size of the optical image may be determined and in step 410 the amount of available memory on the device may be determined. And in step 412, the level of network connectivity available may be determined. These criteria may be used in step 414 to determine the preferred location of advanced OCR processing, whether locally on the device or remotely on the OCR server.

In step 414, process flow 400 employs various criteria to determine whether to perform advanced OCR processing locally on the device. In particular embodiments, this criteria may include the device type, image type, size of the optical image, available memory, and current level of network connectivity. For example, in particular embodiments, the device may determine if the device type matches a supported device. Particular devices that are known to have sufficient computing resources may be predefined as a supported device. In addition, certain image types may require more computation than others, and thus affect whether the advanced OCR processing is performed locally. For example, performing optical recognition of a bill may be comparatively more resource intensive than performing optical recognition of a bar code. In particular embodiments, the device may compare the amount of available memory against the size of the optical image. In some implementations, a device may determine that it can perform advanced OCR processing locally if the available memory is equal to or greater than a certain multiple of the size of the image. Other embodiments may evaluate the current level of network connectivity. If there is strong network connectivity (e.g. 3G or above), the device may choose to transmit the optical image to an OCR server for advanced OCR processing. If the level of network connectivity is poor to acceptable (e.g., below 3G), the device may choose to perform the advanced OCR processing locally.

In other embodiments, the device may choose to transmit the optical image to an OCR server for advanced OCR processing based on the type of network connectivity. For example, the device may choose to transmit the optical image to an OCR server for advanced OCR processing when there is Wi-Fi (802.11) connectivity or when connected to a trusted Wi-Fi network. In certain embodiments, the device may prohibit transmission of the optical image to an OCR server for advanced OCR processing when there is cellular connectivity or a particular type of cellular connectivity. In other embodiments, the device may transmit the optical image to an OCR server for advanced OCR processing when the cellular network is a home cellular network. In those embodiments, the device may prohibit transmission of the optical image to an OCR server for advanced processing when the device is roaming on a cellular network other than its home cellular network. In some embodiments, the device may choose to perform advanced OCR processing locally if it determines that the server is unavailable or the server is overloaded. In those circumstances, the device may perform advanced OCR processing locally even though the level and/or type of network connectivity is acceptable. In particular implementations, the device may recover from any failure or error that occurs while attempting to perform advanced OCR processing locally on the device by transmitting the image to the OCR server either immediately or when the type and/or level of network connectivity is acceptable.

In particular embodiments, if the available memory is equal to or less than the size of the optical image, the device may determine that advanced OCR processing should not be performed locally, and instead, should be performed by an OCR server. In other embodiments, if the available memory is equal to or less than twice the size of the optical image and the image type is a check or a bill, the device may determine that advanced OCR processing should be performed by an OCR server. In certain embodiments, if the available memory is equal to or greater than four times the size of the optical image, then the device may determine that advanced OCR processing should be performed locally. In particular embodiments, the device may determine whether to perform advanced OCR processing locally based, at least in part, on the available memory meeting a suitable predetermined multiple or percentage of the size of the optical image, or the available memory falling in between two or more suitable predetermined multiples or percentages of the size of the optical image.

In certain embodiments, the decision of whether to perform advanced OCR processing locally may be influenced by a comparison of the on-device advanced OCR processing throughput and the sum of the server-side advanced OCR processing throughput and the current estimated network throughput.

In some embodiments, when it is first determined that the advanced OCR processing should be performed by the OCR server but the current level of network connectivity is poor to acceptable (e.g., below 3G), the device may attempt at least once to perform the advanced OCR processing locally. If the process fails, the device may transmit the optical image to the OCR server for processing or wait until there is better network connectivity. In certain implementations, if the optical image is queued for later transmission to the OCR server, the device may notify the user that the optical image is queued and will be processed at a later time. In other embodiments, if the level of connectivity is strong (e.g., at least 3G), then the device will proceed with transmitting the optical image and other relevant data to the OCR server for advanced OCR processing.

If it is determined in step 414 that the advanced OCR processing should be performed locally, process flow 400 proceeds to step 416 where the text is extracted from the optical image. This extraction of text may be performed using off-the-shelf open source software such as Tesseract-ocr and/or Leptonica. In the next step, step 418, the device may determine name-value pairs associated with the extracted text. In some embodiments, this determination of name-value pairs may also depend on the image type. For example, if the image type is a check, certain fields such as payee, date, amount, memo, and signature may be anticipated.

Next, the computed name-value pairs are presented to the user in step 420 for confirmation, and confirmation is received using a user interface in step 422. Once the name-value pairs are confirmed, the name value pairs and any other relevant data (e.g., image type) may be transmitted to an appropriate remote data server for further processing. For example, after the names and values for a check are detected, they may be transmitted to a check processing server, such as check processing server 114, for final processing by an appropriate banking institution. In some implementations, the device may determine whether an acceptable type and/or level of network connectivity is available before transmitting the name-value pairs to an appropriate remote data server. In those circumstances, the user may be notified that the name-value pairs are being queued for future submission and processing.

However, if it is determined in step 414 that the advanced OCR processing should not be performed locally, then in step 426, the optical image and any other relevant data may be transmitted to the OCR server for advanced OCR processing. In that circumstance, the text extraction and name-value pair detection may be performed on the OCR server. Once complete, the OCR server may send the detected name-value pairs to the device for user confirmation or it may validate the name-value pairs against other enterprise databases. Following receipt and confirmation of name-value pairs in steps 420 and 422, the confirmed name-value pairs and any other relevant data (e.g., image type) may be transmitted to an appropriate remote data server for further processing. As discussed above, the device may determine whether an acceptable type and/or level of network connectivity is available before transmitting the name-value pairs to an appropriate remote data server. In those circumstances, the user may be notified that the name-value pairs are being queued for future submission and processing.

In some implementations, once process flow 400 is complete, the user may be notified that the submission is complete. In certain embodiments, the optical image, extracted text, and/or name-value pairs may be sent to an appropriate remote data server or the OCR server for archival.

While flow chart 400 is illustrated as including specific steps arranged in a particular sequence, it should be understood that various embodiments may operate using any suitable arrangement and collection of steps capable of providing functionality such as that described. Accordingly, modifications, additions, or omissions may be made to flow chart 400 as appropriate.

Although the present disclosure describes several embodiments, it should be understood that a myriad of changes, substitutions, and alterations can be made without departing from the spirit and scope of the invention as defined by the appended claims.

What is claimed is:

1. An apparatus, comprising:
    a user interface operable to receive an image type from a user, the image type corresponding to an image to be photographed;
    a camera operable to receive the image;
    a memory operable to store the image type and the received image;
    a network interface operable to communicate with one or more networks;
    a processor communicatively coupled to the user interface, the camera, the memory, and the network interface, the processor operable to determine a device type and determine whether to perform optical character recognition (OCR) processing of the received image locally based on one or more OCR parameters; and
    if it is determined to perform OCR processing of the received image locally:
    compute one or more name-value pairs corresponding to the received image, wherein computing one or more name-value pairs corresponding to the received image comprises:
        extracting text from the received image;
        determining the name-value pairs based on the extracted text;
        requesting, using the user interface, confirmation of the name-value pairs by the user; and
        receiving confirmation of the name-value pairs by the user; and
    transmit the name-value pairs to a remote data server for processing.

2. The apparatus of claim 1, wherein the one or more OCR parameters are selected from the group consisting of: the device type, the image type, a size of the received image, an available amount of the memory, and a current level of network connectivity.

3. The apparatus of claim 1, wherein determining whether to perform OCR processing of the received image locally based on one or more parameters comprises:
    calculating a multiple by which an available amount of the memory is greater than or equal to a size of the received image; and
    determining whether to perform the OCR processing of the received image locally based on the calculated multiple and one or more additional OCR parameters, the additional OCR parameters comprising one or more parameters selected from the group consisting of: the device type, the image type, and a current level of network connectivity.

4. The apparatus of claim 3, wherein determining whether to perform the OCR processing of the received image locally further comprises determining to perform the OCR processing of the received image locally if the calculated multiple is equal to or greater than four and the device type is a predefined supported device.

5. The apparatus of claim 3, wherein determining whether to perform the OCR processing of the received image locally further comprises determining to perform the OCR processing of the received image locally if the calculated multiple is equal to or greater than two, the device type is a predefined supported device, the image type is a predefined supported image type for local OCR processing, and the current level of network connectivity is less than or equal to a predefined network connectivity threshold for remote OCR processing.

6. The apparatus of claim 1, wherein if it is determined not to perform OCR processing of the received image locally, the processor is further operable to:
    transmit the received image and the image type to a remote OCR server for OCR processing;
    receive one or more name-value pairs from the remote OCR server;
    request, using the user interface, confirmation of the name-value pairs by the user;
    receive confirmation of the name-value pairs by the user; and
    transmit the confirmed name-value pairs to the remote data server for processing.

7. The apparatus of claim 6, wherein the processor is further operable to perform OCR processing of the received image locally if transmission of the received image and the image type to a remote OCR server for processing fails.

8. A method, comprising:
    determining a device type;
    receiving an image type from the user, the image type corresponding to an image to be photographed;
    receiving the image;
    determining whether to perform optical character recognition (OCR) processing of the received image locally based on one or more OCR parameters; and
    if it is determined to perform OCR processing of the received image locally:

computing one or more name-value pairs corresponding to the received image, wherein computing one or more name-value pairs corresponding to the received image comprises:
  extracting text from the received image;
  determining the name-value pairs based on the extracted text;
  requesting a confirmation of the name-value pairs by the user; and
  receiving confirmation of the name-value pairs by the user; and
transmitting the name-value pairs to a remote data server for processing.

9. The method of claim 8, wherein the one or more OCR parameters are selected from the group consisting of: the device type, the image type, a size of the received image, an available amount of the memory, and a current level of network connectivity.

10. The method of claim 8, wherein determining whether to perform OCR processing of the received image locally based on one or more parameters comprises:
  calculating a multiple by which an available amount of the memory is greater than or equal to a size of the received image; and
  determining whether to perform the OCR processing of the received image locally based on the calculated multiple and one or more additional OCR parameters, the additional OCR parameters comprising one or more parameters selected from the group consisting of: the device type, the image type, and a current level of network connectivity.

11. The method of claim 10, wherein determining whether to perform the OCR processing of the received image locally further comprises determining to perform the OCR processing of the received image locally if the calculated multiple is equal to or greater than four and the device type is a predefined supported device.

12. The method of claim 10, wherein determining whether to perform the OCR processing of the received image locally further comprises determining to perform the OCR processing of the received image locally if the calculated multiple is equal to or greater than two, the device type is a predefined supported device, the image type is a predefined supported image type for local OCR processing, and the current level of network connectivity is less than or equal to a predefined network connectivity threshold for remote OCR processing.

13. The method of claim 8, further comprising, if it is determined not to perform OCR processing of the received image locally:
  transmitting the received image and the image type to a remote OCR server for OCR processing;
  receiving one or more name-value pairs from the remote OCR server;
  requesting confirmation of the name-value pairs by the user;
  receiving confirmation of the name-value pairs by the user; and
  transmitting the confirmed name-value pairs to the remote data server for processing.

14. The method of claim 13, further comprising performing OCR processing of the received image locally if transmission of the received image and the image type to a remote OCR server for processing fails.

15. A non-transitory computer-readable medium comprising instructions, the instructions operable when executed by a processor to:
  determine a device type;
  receive an image type from the user, the image type corresponding to an image to be photographed;
  receive the image;
  determine whether to perform optical character recognition (OCR) processing of the received image locally based on one or more OCR parameters; and
  if it is determined to perform OCR processing of the received image locally:
  compute one or more name-value pairs corresponding to the received image, wherein computing one or more name-value pairs corresponding to the received image comprises:
    extracting text from the received image;
    determining the name-value pairs based on the extracted text;
    requesting a confirmation of the name-value pairs by the user; and
    receiving confirmation of the name-value pairs by the user; and
  transmit the name-value pairs to a remote data server for processing.

16. The non-transitory computer-readable medium of claim 15, wherein determining whether to perform OCR processing of the received image locally based on one or more parameters comprises:
  calculating a multiple by which an available amount of the memory is greater than or equal to a size of the received image; and
  determining whether to perform the OCR processing of the received image locally based on the calculated multiple and one or more additional OCR parameters, the additional OCR parameters comprising one or more parameters selected from the group consisting of: the device type, the image type, and a current level of network connectivity.

17. The non-transitory computer-readable medium of claim 16, wherein determining whether to perform the OCR processing of the received image locally further comprises determining to perform the OCR processing of the received image locally if the calculated multiple is equal to or greater than four and the device type is a predefined supported device.

18. The non-transitory computer-readable medium of claim 16, wherein determining whether to perform the OCR processing of the received image locally further comprises determining to perform the OCR processing of the received image locally if the calculated multiple is equal to or greater than two, the device type is a predefined supported device, the image type is a predefined supported image type for local OCR processing, and the current level of network connectivity is less than or equal to a predefined network connectivity threshold for remote OCR processing.

* * * * *